Dec. 1, 1964 W. G. A. SCHULZE 3,159,456
APPARATUS FOR PRODUCING AMMONIUM SALT CRYSTALS
Filed May 6, 1959 8 Sheets-Sheet 2

INVENTOR.
William G. A. Schulze
BY
James E. Toomey
ATTORNEY

Dec. 1, 1964    W. G. A. SCHULZE    3,159,456
APPARATUS FOR PRODUCING AMMONIUM SALT CRYSTALS
Filed May 6, 1959    8 Sheets-Sheet 4

INVENTOR.
William G.A.Schulze
BY
*James E. Toomey*
ATTORNEY

Dec. 1, 1964   W. G. A. SCHULZE   3,159,456
APPARATUS FOR PRODUCING AMMONIUM SALT CRYSTALS
Filed May 6, 1959   8 Sheets-Sheet 6

INVENTOR.
William G. A. Schulze
BY
James E. Toomey
ATTORNEY

Dec. 1, 1964 W. G. A. SCHULZE 3,159,456
APPARATUS FOR PRODUCING AMMONIUM SALT CRYSTALS
Filed May 6, 1959 8 Sheets-Sheet 8

INVENTOR.
William G. A. Schulze
BY
*James E. Toomey*
ATTORNEY

United States Patent Office 3,159,456
Patented Dec. 1, 1964

3,159,456
APPARATUS FOR PRODUCING AMMONIUM SALT CRYSTALS
William G. A. Schulze, Ontario, Calif.; Hertha M. Schulze, executrix of said William G. A. Schulze, deceased
Filed May 6, 1959, Ser. No. 811,326
5 Claims. (Cl. 23—260)

This invention relates to an improved method and apparatus for recovering and absorbing ammonia from a gaseous mixture such as coke oven gases and to the production of ammonium salt crystals such as ammonium sulphate and diammonium phosphate.

Conventional ammonium absorbers commercially used are of varied types. One is the so-called "cracker pipe" which involves immersing one or more pipes with slots to a suitable depth in a supersaturated ammonium salt liquor bath containing an acid, e.g., ammonium sulphate containing sulphuric acid. The ammonia-containing gas is pumped through the slots of the pipes and bubbles through the liquor bath. The gas passes to a gas space above the level of the liquor bath wherein it is subjected to a spray of acid-containing ammonium salt liquor. The spray liquor absorbs any ammonia remaining in the gas which was not absorbed in the liquor bath. The spray of liquor is maintained by overflowing liquor from the level of the liquor bath through a sealed overflow into an external recirculation system from which it is pumped back to the absorber as a spray into the center of the gas space. The gas is subsequently passed out of the absorber through an outlet pipe leading from the gas space. Crystals of ammonium salt are formed in the supersaturated liquor bath and fall to the botom where they are removed for additional processing. Acid is added to the liquor to replace that consumed in the formation of the ammonium salt crystals. Although this type of absorber is fairly satisfactory, it is necessary to halt operations at times in order to dissolve rock salt deposits from the apparatus which tend to deposit from the liquor due to the fineness of the crystals formed. The gases introduced must be pumped into the liquor against a pressure head and this involves a costly operation. Furthermore, the gas handling capacity of the "cracker pipe" is somewhat limited.

Another type of ammonia absorber involves the use of packed towers. Ammonia-containing gases are pumped to the bottom of a packed tower and flow upwardly therethrough. Acid or unsaturated ammonium salt-acid containing liquor is introduced by suitable means such as sprays at the top of the tower and intimately contacts the upflowing gases as it flows downwardly over the packing of the tower. Saturated ammonium salt liquor is withdrawn from the bottom of the tower and processed for recovery of ammonium salts crystals. In this type of absorber, problems are encountered when the liquor becomes supersaturated at any point in the tower since fine crystals deposit therefrom and clog the packing in the tower.

Another recently developed type of ammonia absorber comprises a vertical cylindrical vessel containing an unobstructed scrubbing area wherein a certain type of spray nozzle is used which produces a very fine, evenly distributed spray. The spray is a saturated ammonium salt liquor containing a large amount of crystals which contacts upflowing ammonia-containing gases introduced at the bottom of the vessel. The saturated liquor becomes supersaturated during contact with the gases forming more crystals. The contacted liquor and crystals pass through a seal pipe at the bottom of the vessel to an overflow tank. The liquor passes from a supersaturated state to a saturated state due to contact with the crystals. The saturated liquor containing a large amount of crystals in suspension is recycled from the overflow tank to the sprays. A much smaller amount of crystals is continuously withdrawn from the bottom of the overflow tank for processing. This type of absorber provides efficient removal of ammonia from the gases. However, the crystal size of the ammonia salt produced is very small, which causes the crystals to cake easily and therefore the product is less salable. In order to overcome this problem, it was necessary, at considerable expense, to install compacting plants or evaporator type crystallizers to increase the particle size of the ammonia salt produced in this type of absorber since recirculation of crystals in the spray liquor does not achieve the desired increase in crystal size. Another disadvantage is the carryover of entrained gases through the exit seal pipe at the bottom of the absorber vessel into the open overflow tank where an explosive atmosphere is created when the gases rise to the surface. The apparent cause of gas entrainment is a lack of sufficient liquor reservoir in the bottom portion of the absorption vessel to allow the entrained gases to rise to the surface within the vessel and subsequently to combine with the exiting gases.

An ammonia absorber is therefore desired by the industry which overcomes the above mentioned difficulties and at the same time has a high efficiency, low operating and maintenance costs with the resultant production of high quality ammonium salt crystals.

Furthermore, since most absorber units are combined with evaporators which concentrate the liquor of ammonium salt obtained from the absorber to supersaturation to effect crystallization in a crystallizer, problems of plugging and unsatisfactory operation are encountered unless the evaporator and atmospheric condenser are operated continuously with the absorber. At times there is no appreciable demand for large size crystals of salt, however, smaller size crystals are satisfactory for some markets, such as the mixed fertilizer industry. However, in the absorber system described, even the production of small crystals requires the use of large amounts of steam and water for the atmospheric condenser to create vacuum evaporation. This is an unnecessary expense in the above mentioned case and must be assumed with the installations. A desideratum of the industry is a system which is flexible to the extent that when only small size crystals are satisfactory to be produced that they can be produced without the use of an evaporator and crystallizer with the resultant savings in the cost of water and steam.

This invention provides an improved novel method and apparatus for absorbing ammonia from ammonia-containing gases, and provides a novel ammonia absorber of high efficiency, and low operating and maintenance costs. Furthermore, there is provided an improved novel method and apparatus for producing ammonium salt crystals which does not require the use of an evaporator-crystallizer system to be operated in conjunction with the ammonia absorber. Furthermore, there is provided an improved novel method and apparatus for achieving an intimate contact of gases and liquor. A further provision of this invention is a novel improved method and apparatus for liquor distribution within the absorbed. Another provision of this invention is a novel improved method and apparatus for introducing the gas into the absorber for contact with the liquor. In addition, this invention provides for a method and apparatus for producing ammonium salt crystals of suitable size such as diammonium phosphate, ammonium sulphate, etc.

In accordance with this invention, an ammonium salt is produced from ammonia-containing gases and an acid containing saturated liquor in a novel gas absorber vessel which comprises a conical bottom, a gas scrubbing chamber in the upper portion of the vessel, an annular gas introducing device surrounding the periphery of the scrubbing chamber, and a plurality of gas inlets communicating between the gas scrubbing chamber and the gas introducing device. The vessel is also provided with a liquor distributor at the top of the scrubbing chamber for the introduction of a gas scrubbing liquor. In the operation of the absorber, an ammonia-containing gas in introduced tangentially into the scrubbing chamber from the annular gas introducing device as a plurality of gaseous streams through the plurality of gas inlets at the periphery of the scrubbing chamber. The introduced plurality of gaseous streams form a whirling cyclone of gas within the scrubbing chamber. Simultaneously, there is introduced an acid-containing saturated ammonium salt liquor through a liquor distributor at the top of the absorber vessel. The liquor issuing from the distributor contacts the whirling cyclone of gas and in the resultant violent mixing absorbs ammonia therefrom. The gas-contacted liquor becomes supersaturated during this process and falls into a supersaturated liquor bath maintained in the conical bottom of the vessel where ammonium salt crystals are formed. Liquor and crystals are withdrawn therefrom to a crystal separator wherein the crystals are separated from the liquor. Liquor, which is now in a saturated state instead of a supersaturated state due to intensive crystal contact, is recirculated from the separator to the scrubbing chamber of the absorber.

The saturated liquor recycled and introduced into the scrubbing chamber is substantially free of ammonium salt crystals. Crystals of ammonium salt in the liquor to the absorber sprays are unnecessary ballast and do not absorb ammonia as would liquor replacing the crystal volume. As ammonia is absorbed from the gases, crystals are formed, begin to grow in size and continue to grow during the downward movement in the supersaturated bath.

The ammonia-containing gases are introduced into the scrubbing chamber in a tangential horizontal direction at the periphery thereof. This is accomplished by providing an annular circular gas duct around the scrubbing chamber. The inner wall of the duct contains a plurality of slotted or circular openings through which the gas passes and enters into the scrubbing chamber. In order to introduce the gas tangentially, the openings may be disposed angularly through the inner duct wall. Thus, the plurality of openings may be circular in form, all of which point in the same angular direction horizontally into the scrubbing chamber. A plurality of vertical slots are preferably used with vanes which guide and deflect the gas through the slot in a tangential direction. Provision is made to make the openings adjustable in size to enable the regulation of the flow of gases therethrough. Furthermore, the adjustable opening arrangement permits the gas to enter the scrubbing chamber at the highest possible pressure regardless of the rate of operation. Thus, when gas volume and pressure are high, the openings can be set wide open, whereas when gas volume and pressure are low during reduced operations, the openings can be set partly open.

The scrubbing chamber is provided at the top with a central gas outlet. The whirling cyclone of gas, created by introducing the gas tangentially through the plurality of openings, moves rapidly towards the center of the scrubbing chamber. The gas is directed upward and out through the gas outlet by a guide cone of suitable material disposed near the gas outlet. The cone extends into a portion of the scrubbing area.

The liquor is introduced at the top of the scrubbing chamber through a distributor. The distributor provides for the introduction of showers of liquor such as a plurality of free-falling streams or sprays into and throughout the cross-sectional area of the scrubbing chamber. One distributor arrangement includes a concentric series of horizontal circular troughs containing open bottoms. The liquor is passed into the troughs and emerges from the open bottoms as a series concentric falling curtains of liquor.

Another type of liquor distributor provides for a series of nozzles disposed in a horizontal, concentric arrangement at the top of the scrubbing chamber whereby an outer ring of nozzles point in the direction of gas flow and another inner ring of nozzles point against the direction of gas flow. The force of the liquor sprays from the outer ring of nozzles tends to increase the velocity of the whirling gas cyclone in the outer area of the scrubbing chamber, whereas the liquor sprays from the inner ring of nozzles violently contact the inner area of whirling gas prior to its removal from the central outlet at the top of the scrubbing chamber. Droplets of liquor carried by the whirling gas cyclone from the outer spray area which have not dropped into the bath meet the spray droplets from the inner spray nozzles head on causing the droplets to spatter and thereby increasing intimate contact between gas and liquor. In larger absorbers, several concentric rings of spray nozzles may be used and their directions may be alternated with and against the gas flow, with the innermost ring of nozzles always arranged against the gas flow.

The intimate contact of gas and liquor during the cyclonic action achieves the highest possible ammonia absorption. The liquor, after absorbing the ammonia, falls into the conical lower portion of the vessel wherein a liquor bath is maintained. The inner wall of the annular gas introducing duct extends into the solution bath forming a liquid seal. The level of liquor in the bath is maintained by an overflow pipe whereby liquor is overflowed therethrough to a surge tank containing makeup liquor, makeup acid is added, and the conditioned liquor is returned to the absorber through a spray nozzle disposed in the gas outlet. This spray containing a higher acid content removes the last traces of ammonia from the exiting gases and keeps the top of the cone, near the gas outlet, washed clean from salt accumulation.

Liquor and crystals are removed from the conical bottom of the absorbed and are pumped to a crystal separator wherein the crystals formed in the supersaturated liquor during the downward movement in the bath are separated by centrifugal force towards the bottom of the separator cone. Any suitable type of crystal separator may be advantageously used. The separated saturated liquor substantially free of crystals is recycled to the liquor distributor of the absorber. The thickened crystal slurry may be processed in a suitable evaporator crystallizer system to produce larger size crystals. In my copending U.S. application Serial No. 769,129, filed October 23, 1958, now abandoned there is described a novel method and apparatus for crystallizing and classifying crystals from a liquor and is advantageously used with the crystal slurry obtained from the absorber of this invention.

Alternatively, the thickened crystals slurry may be processed in accordance with this invention without the use of an evaporator-type-crystallizer to increase the size of the crystals produced. While the crystal size obtained thereby is less than in an evaporator crystallizer, it nevertheless enables the production of a product of improved crystal size with less caking characteristics than fine salt. This is accomplished by the use of an additional secondary crystal separator similar to the separator referred to above, however, smaller in size to allow only the larger crystals to be separated from the liquor by centrifugal action and the recycle of smaller size crystals into the liquor bath of the absorber.

The process and apparatus of this invention may be used to produce various ammonium salts from ammonia-containing gases, e.g., ammonium sulphate, diammonium phosphate, etc.

For a clearer understanding and advantages of the invention, the following description and drawings will illustrate the preferred embodiments using diammonium phosphate as a specific example of ammonium salt producible.

Referring to the drawings:

FIGURE 2 is a vertical sectional elevation of the improved ammonia absorber including one embodiment of the liquor distributor and the crystal separator;

Figure 1:
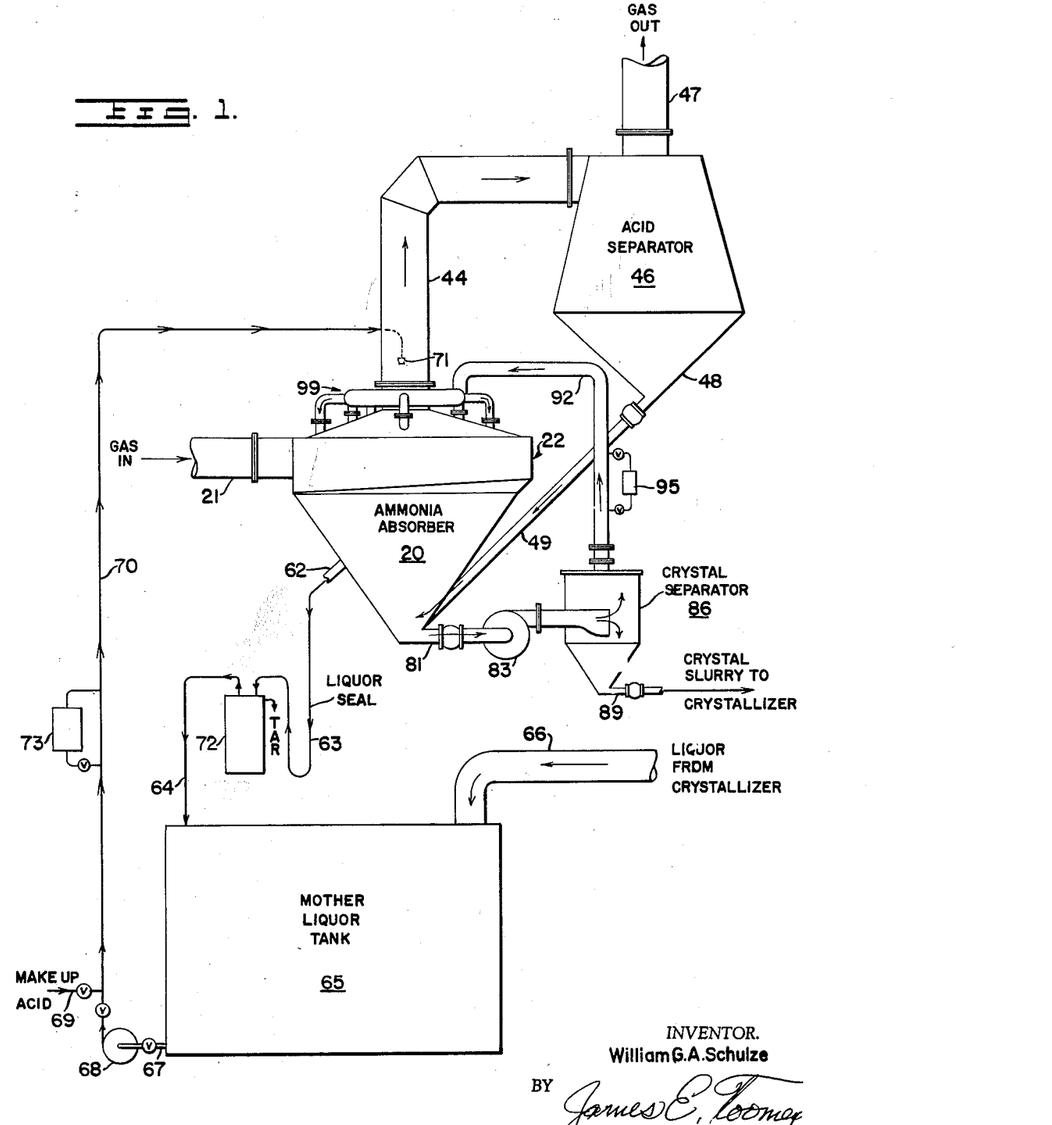
FIGURE 1 is a diagrammatic illustration of one form of the invention showing the arrangement of the apparatus used including the improved ammonia absorber.

Referring particularly to FIGURE 1, there is illustrated generally an ammonia absorbing system comprising an ammonia absorber 20 wherein ammonia-containing gases are pumped in through line 21, through gas introducing duct 22 and contacted with a saturated diammonium phosphate liquor recycled through line 92 and the liquor distributor 99. A diammonium phosphate crystal slurry is removed from the bottom of the absorbed through line 81 by pump 93 and passed to the crystal separator 86 wherein the liquor is separated from the crystals and recycled through line 92 to the absorber. A concentrated diammonium phosphate crystal slurry is removed through valved line 89 and passed to an evaporator crystallizer (not shown) for further processing.

The gases from which the ammonia has been absorbed pass out of the absorber through the exhaust gas line 44 to a conventional acid separator 46. A minor amount of acid-containing liquor carried out with the exhaust gases is removed therein and returned to the absorber through line 49 from the bottom portion 48 of the acid separator. The acid-free gases are removed through gas outlet line 47 for further processing.

Overflow liquor from the absorber 20 is removed through overflow line 62 to an external liquor conditioning system. From line 62 the liquor passes through a liquid seal 63, through a conventional tar skimmer 72 and through line 64 into a mother liquor surge tank 65. Spent liquor from a crystallizer-evaporator is returned to the mother liquor tank through return line 66. Mother liquor is withdrawn through valved line 67 by pump 68, makeup acid is added through valved line 69, and the reconditioned mother liquor is passed through recycle line 70, through the heater 73 if necessary, through the nozzle 71 and into the gas exhaust outlet 44.

The operation of one embodiment of the ammonia absorber unit 20 will be described with reference to FIGURES 2-7. The ammonia absorber 20 generally comprises a vertical vessel with a conical lower portion 33, top 105, a gas introducing duct 22, a liquor distributor 99, a scrubbing chamber 112, a gas outlet 44, crystal slurry outlet line 81, overflow liquor line 62, acid-liquor return line 49, and guide cone 40.

Figures 3, 6:
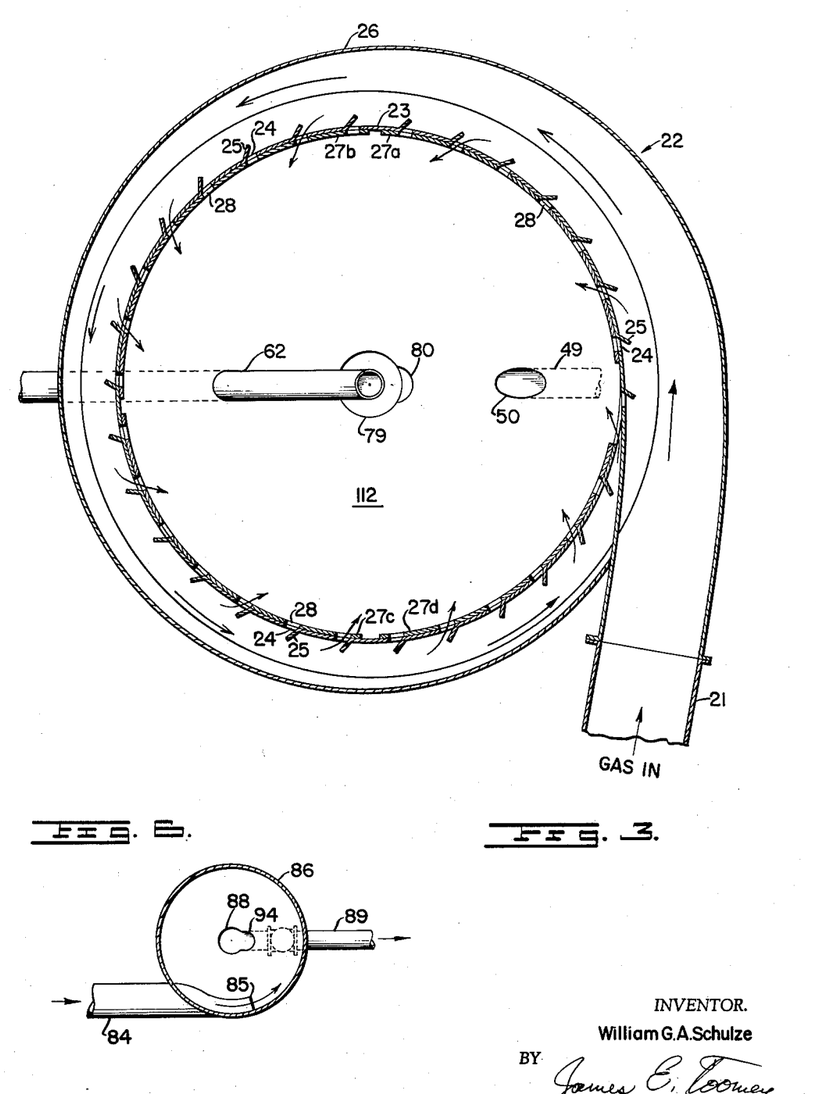
FIGURE 3 is a top sectional view of the absorber taken along line 3—3 of FIGURE 2.
FIGURE 6 is a top sectional view of the crystal separator taken along line 6—6 of FIGURE 2.

Ammonia-containing gases, such as coke oven gases, are pumped into the gas introducing duct 22 through line 21. The gas duct 22 comprises an outer circular wall 26, top wall 34 contiguous with the top 105 of the absorber, and a lower slanting wall 35 contiguous with the conical portion 33 of the absorber. The duct is circular and of decreasing cross sectional area as shown in FIGURE 3. An inner vertical wall 23 of the duct confines a scrubbing chamber 112. The lower end of the wall 23 extends into the liquor bath 60 forming a liquid seal in the area 36 thereby confining the gases in the duct 22. The lower portion of the scrubbing chamber is bounded by the surface 61 of the liquor bath 60, and the upper portion of the chamber is bounded by the top 105.

Figures 4, 5:
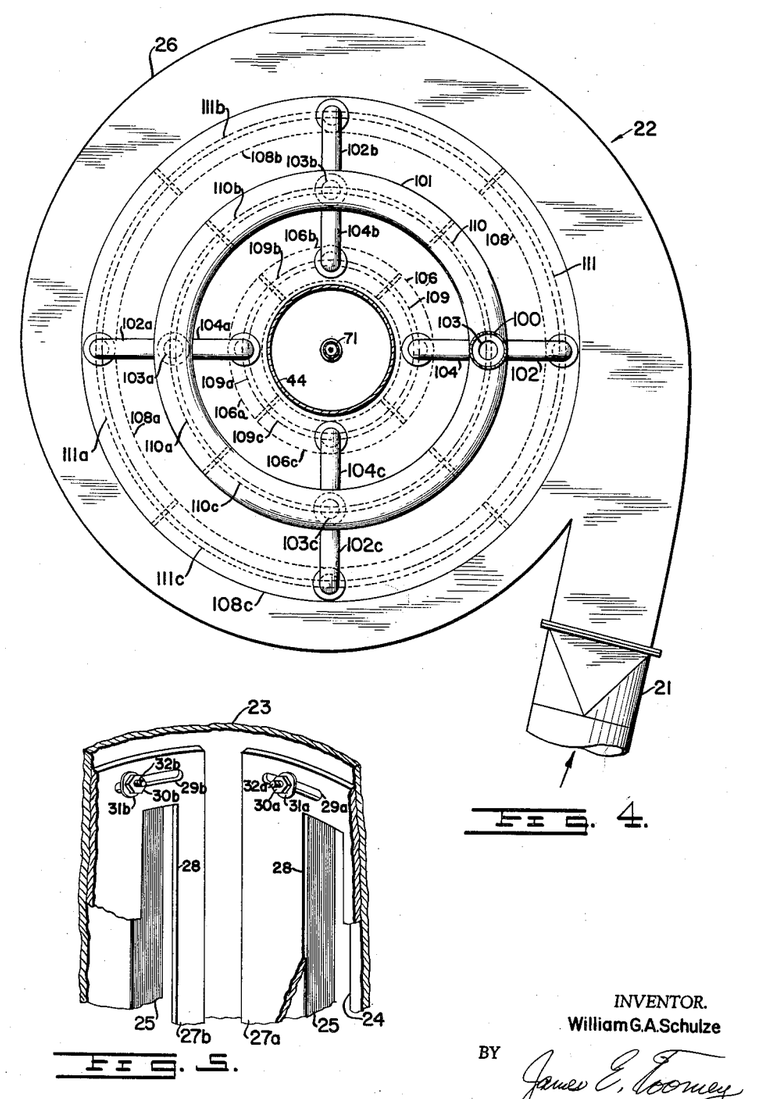
FIGURE 4 is a top view, partly in section, of the absorber taken along line 4—4 of FIGURE 2.
FIGURE 5 is a detailed view, with parts broken away for clarity, of the inner wall of the gas duct in the absorber, showing the gas introducing slots and portions of the adjustable quarter panels.

The inner wall 23 of the duct contains a plurality of vertical elongated slots 24. The slots contain guide vanes 25 which deflect and guide the gas into the slots during its passage through the duct. Provision is made to adjust the size of the slot openings 24. This is accomplished by providing a second series of vertical elongated slots 28 substantially similar in size to slots 24. The slots 28 are contained on four curved quarter panels 27a, 27b, 27c, and 27d, all of which are adjustable circumferentially along the inner wall 23. Thus as shown in FIGURE 5, the opening of slots 24 may be made larger or smaller by adjusting the quarter panel 27a counterclockwise or clockwise along the inner wall 23. The slot 28 thereby is placed in position across the slot 24 producing a larger or smaller opening communicating between the area in the duct 22 and the scrubbing chamber 112. The gas duct wall 23 contains bolts such as 32a. The quarter panel 27a contains horizontal adjusting slots such as 29a, and is secured after adjustment by a washer 31a and nut 30a. Similarly, the other quarter panels are adjustable.

The gas passes from the duct 22 through each series of slots 24 and 28 and enters the scrubbing chamber 112 tangentially as shown in FIGURE 3. A cyclone of whirling gas is created which moves rapidly towards the center of the chamber. The whirling gas is directed upward and into the gas outlet 44 by a stainless steel guide cone 40, which has a round opening 41 at the top and a round opening 42 at the bottom.

Figures 7, 8:
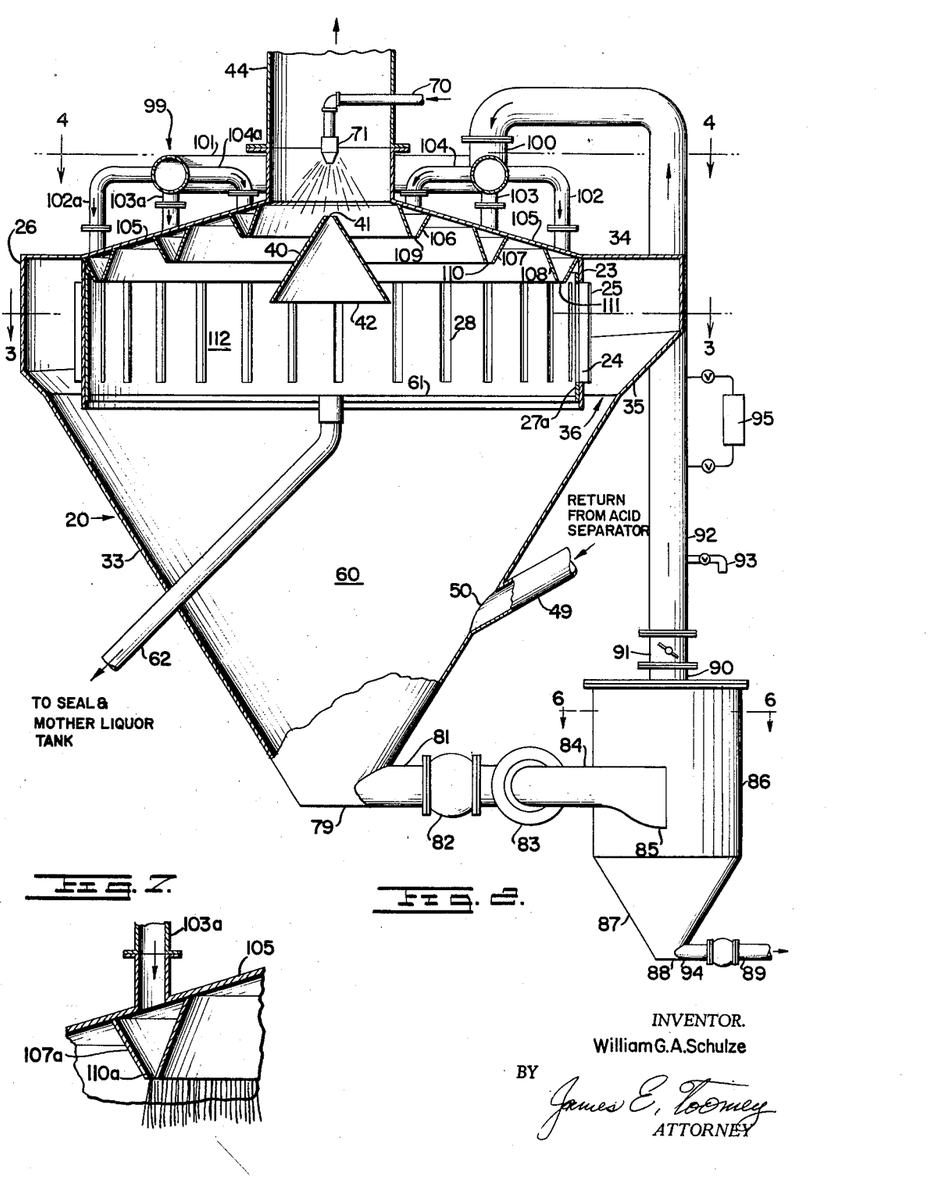
FIGURE 7 is a detailed view, with parts broken away for clarity, of a portion of the liquor distributor embodiment of FIGURE 2.
FIGURE 8 is a vertical sectional elevation of the improved ammonia absorber including another embodiment of the liquor distributor and the crystal separator.
Figure 8:
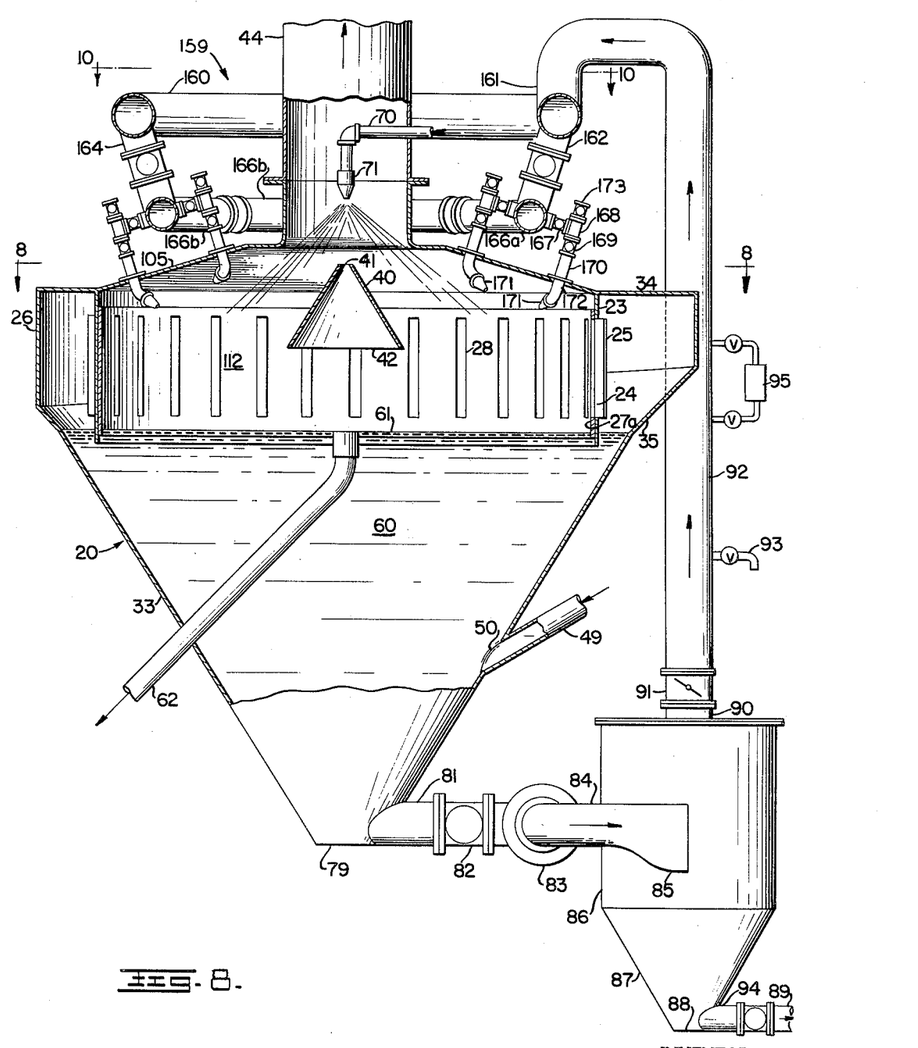

The whirling gas as it passes through the scrubbing chamber meets, penetrates, and mixes violently with several concentric falling curtains of acid-containing saturated diammonium phosphate liquor which are emitted under low pressure of about 4-5 lbs. from the liquor distributor 99. Recycled liquor from the crystal separator 86 passes through recycle line 92, through heater 95 if necessary, inlet line 100, and into a circular distributor header 101. The liquor passes therefrom into a series of inlet lines 102, 102a, 102b, 102c, 103, 103a, 103b, 103c, 104, 104a, 104b, and 104c through the top wall 105 of the absorber into a series of wedge-shaped troughs disposed concentric under the top wall 105. The troughs 106, 106a 106b, 106c, 107, 107a, 107b, 107c, 108, 108a, 108b, and 108c are open at the bottom forming trough openings 109, 109a, 109b, 109c, 110, 110a, 110b, 110c, 111, 111a, 111b, and 111c respectively. Curtains of liquor emerge from the openings, contact the whirling gases, absorb ammonia, and fall as supersaturated liquor into the bath 60.

Crystals of diammonium phosphate grow in the supersaturated liquor in the bath 60 and move downward through the bath towards the bottom 79 of the absorber. A slurry of crystals is removed through a slurry outlet 80, and line 81 containing valve 82. A variable speed, low head, high volume circulating pump 83 maintains liquor circulation and pumps the crystal slurry to the crystal separator 86 through line 84. The slurry enters the separator tangentially through a slurry inlet 85. Here the crystals of diammonium phosphate are separated by centrifual force towards the bottom 88 of the separator cone 87 and are discharged through outlet 94 by pump pressure as a concentrated slurry through valve line 89 to an evaporator crystallizer (not shown) for further processing.

The liquor substantially free of crystals passes through a top outlet 90 into recycle line 92 which contains a butterfly valve 91, a liquor sampler 93, and a liquor heater 95. For a gas throughput, for example, of approximately 3,000,000 cu. ft. per hour, the liquor circulation through the crystallizer is approximately 5,000 to 6,000 gallons per minute. The amount of liquor in the slurry leaving the crystallizer 86 through line 89 is only a small percentage of the total liquor circulating volume.

The level 61 of the bath 60 is maintained by an overflow line 62 which removes overflow liquor from the bath 60 to a liquor conditioning system described heretofore. The conditioned acidified liquor is returned to the absorber through recycle line 70 in the gas outlet 44. The acidified liquor is sprayed through nozzle 71 into the exiting gases and the higher acid content of the sprayed liquor helps to remove the last traces of ammonia therefrom. The sprayed liquor in addition keeps the surfaces of the cone 40 washed clean from salt accumulation and also enters the opening 41 at the top of the cone to prevent salt accumulation within the cone.

Figure 9:
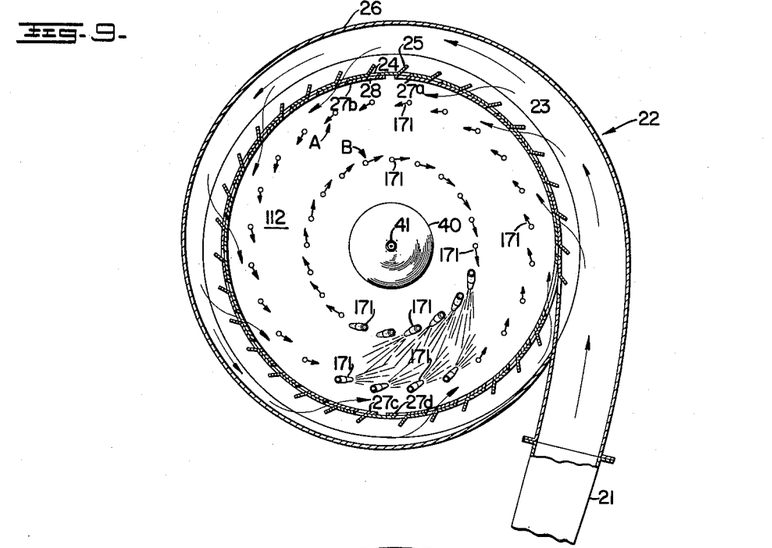
FIGURE 9 is a top sectional view of the absorber taken along line 9—9 of FIGURE 8 showing the arrangement of the spray nozzles.
Figure 10:
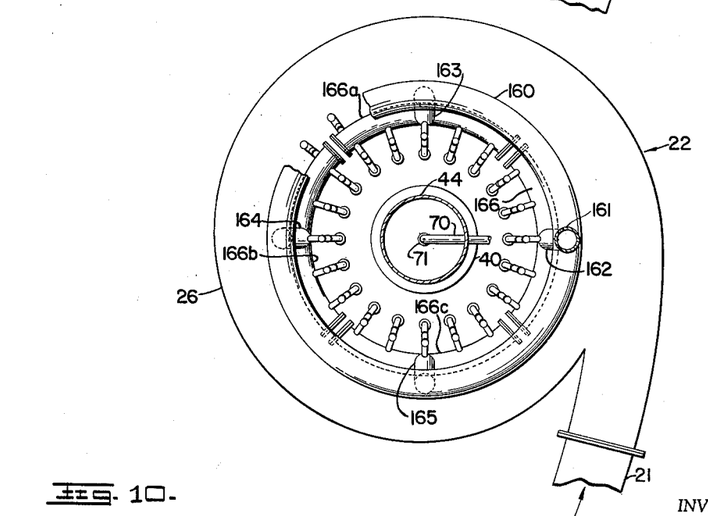
FIGURE 10 is a top view, partly in section, of the absorber taken along line 10—10 of FIGURE 8.

Refer now to FIGURES 8–10 where there is illustrated another embodiment of the novel ammonia absorber utilizing another type of liquor distribution system. The absorber and crystal separator shown in these figures are similar to the ones shown in FIGURES 2–7 except for the liquor distributor system. The gas flow is identical, however, the procedure of allowing liquor to fall as fluid curtains from troughs is changed to sprays of liquor from a series of nozzles. This requires that the differential head of the variable speed pump 83 be increased with a resultant small decrease in liquor circulation rate.

The liquor distributor system generally indicated at 159 utilizes saturated liquor from recycle line 92. The liquor enters a circular header line 160 through an inlet 161. The liquor passes through valved supply lines 162, 163, 164 and 165 to distributor quadrants 166, 166a, 166b, and 166c, respectively. Each distributor quadrant contains two sets of spray nozzles; an outer set pointing in the direction of the gas flow at a slightly inward angle, and an inner set pointing against the gas flow. The spray nozzles as arranged on the four distributor quadrants form a continuous outer ring of nozzles A and a continuous inner ring of nozzles B. Each spray nozzle receives liquor from its respective distributor quadrant. The spray nozzle units each comprise a supply valve 167 connected to the quadrant distributor, a T-connection 168, valve 169, a curved casing 170, and a nozzle 171. The curved casing 170 extends through an opening 172 in the top 105 of the absorber into the scrubbing chamber 112. A valve 173 is also provided to facilitate cleaning of the spray nozzle unit.

As the liquor is sprayed from the nozzles in the rings A and B, the force of the sprays in ring A tends to increase the velocity of the gas cyclone in the outer area of the scrubbing chamber 112. However, as the whirling gas continues to whirl inward and is directed by the cone 40 towards the gas outlet 44, acid liquor droplets from the outer spray area meet droplets of about the same size from the inner sprays of ring B head on with high velocity causing innumerable, but violent, collisions which tend to spatter the droplets increasing the intimate contact between gas and liquor. Spray nozzle 71 in gas outlet 44 is of a type which sprays a coarser spray than the fine sprays from spray rings A and B. The coarser spray droplets in the area above the guide cone 40 combine with the supersaturated, much smaller droplets from the spray rings A and B which are carried by the gas and which have not fallen into the liquor bath 60, forming larger droplets which now fall readily into the liquor bath and thus are prevented from being carried away with the gas through the outlet 44.

The number of sprays in ring B is less than the number in ring A and the effect of the ring B sprays in slowing down the gas velocity is negligible compared to the velocity added from the sprays in ring A. The sprays in ring B are of a somewhat larger capacity than the sprays in ring A to compensate for the lesser number of sprays in ring B, otherwise the difference in the volume of spray liquor from the two spray rings would be too great. However, the total spray volume from ring B should always be slightly less than the total volume from ring A in order that the velocity of the gas cyclone is not appreciably slowed down.

The spray type distributor described above achieves a high degree of ammonia absorption, due to the intimate contact of gas and liquor.

The ammonia absorber embodiments described above require the use of an evaporator-type crystallizer when it is desired to obtain large size diammonium phosphate crystals from the crystal slurry withdrawn from the crystal separator 86 through line 89. The following embodiment of this invention describes a system wherein an evaporator-type crystallizer is not necessary and crystals of diammonium phosphate of increased size may be obtained. This is accomplished by adding a secondary crystal separator with a slurry liquor recirculation system. While the increase in size obtained thereby is less than that obtained in an evaporator-type crystallizer system, it is satisfactory for purposes mentioned heretofore.

Figure 11:
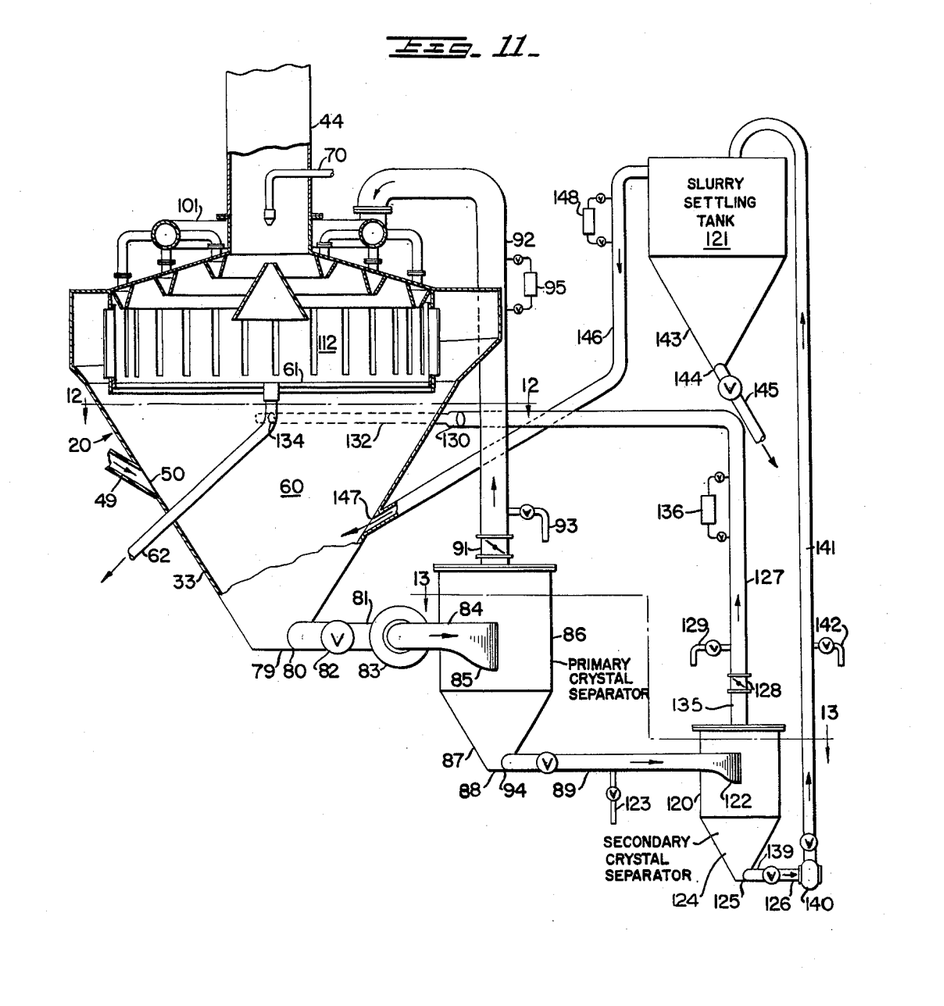
FIGURE 11 is an illustration of another form of the invention wherein primary and secondary crystallizers and a slurry settling tank are used with the improved absorber.
Figure 12:
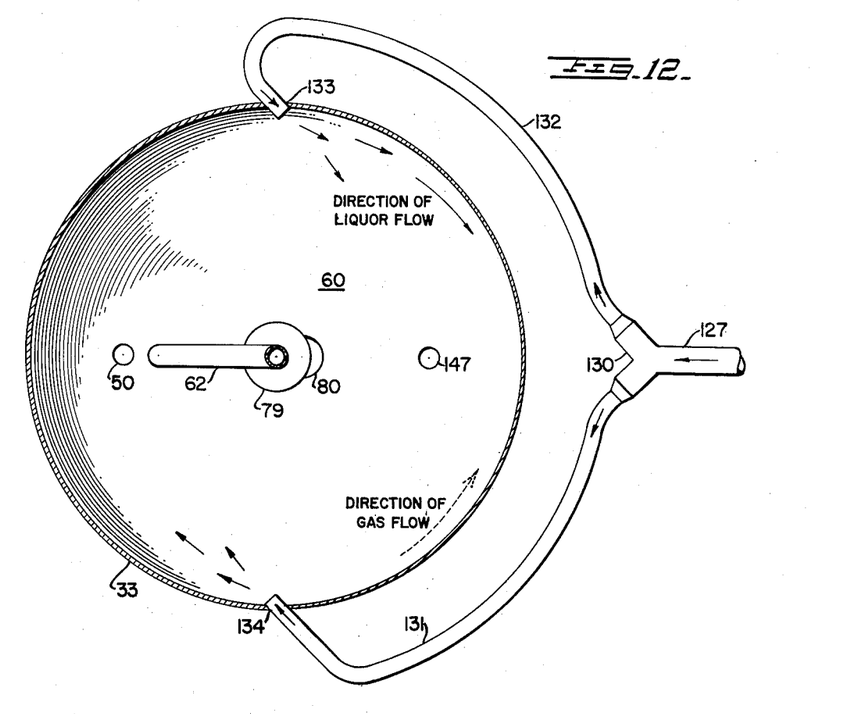
FIGURE 12 is a top view, partly in section, of the absorber taken along line 12—12 of FIGURE 11.
Figure 13:
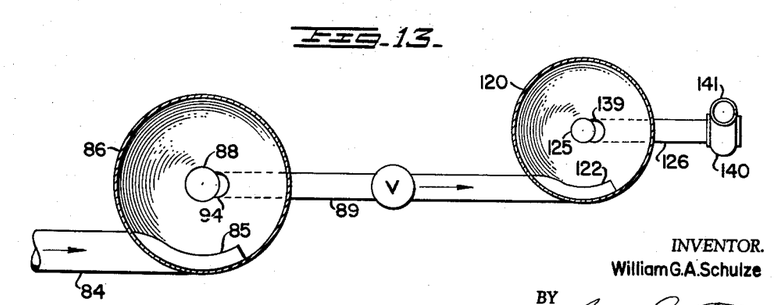
FIGURE 13 is a top view, partly in section, of the primary and secondary crystal separators taken along line 13—13 of FIGURE 11.

Refer now to FIGURES 11–13 wherein there is shown an ammonia absorber 20 and a crystal separator 86 both substantially identical to the previously described embodiments. Although the trough type liquor distributor system is illustrated with the absorber, it is understood that the spray nozzle type distributor system is also applicable in this embodiment of the invention. The crystal separator 86 becomes the primary separator in this system and a secondary crystal separator 120 is added to the system to process the crystal slurry obtained from the outlet line 89 of separator 86 instead of passing it to an evaporator-type crystallizer. A slurry liquor recirculation system from the secondary crystal separator 120 generally comprises lines 127, 131, and 132; a crystal settling tank 121 including pump 140, crystal slurry line 141, and return line 146 to the absorber.

In the operation of the system, the liquor volume in the slurry which is withdrawn from the absorber 20 through outlet line 81 is increased by about 25% above the volume normally withdrawn when the slurry is sent to an evaporator-type crystallizer. The additional volume of liquor is required to operate the secondary crystal separator 120 without decreasing the volume of liquor necessary for circulation through the scrubbing chamber 112 of the absorber. The secondary crystal separator 120 is considerably smaller than the primary one to allow only the larger size crystals in the slurry to be separated by centrifugal force.

Thus, for instance, if the total liquor circulation rate through the scrubbing chamber for effective removal of the ammonia from the gases has been about 5,000 gallons per minute for a given gas volume, the total volume of acid liquor pumped to the primary crystal separator 86 will be increased to about 6,000 gallons per minute. The buttrefly valve 91 in the top outlet line 92 is adjusted to allow 5,000 gallons per minute to be recycled to the scrubbing chamber 112. Substantially all the crystals produced in the absorber are separated by centrifugal force towards the bottom 88 of the primary separator 86. About 1,000 gallons per minute of crystal slurry is removed through the valved slurry line 89 and passed to the secondary crystal separator 120.

The crystal slurry enters the secondary separator 120 tangentially through a slurry inlet 122. The fine and medium size crystals remain in suspension due to the higher turbulence of the smaller separator. The larger crystals are separated to the bottom 125 of the separator cone 124 and are removed as a thickened crystal slurry into valved line 126 through the outlet 139. A slurry pump 140 of high differential head, e.g., about 45 ft., pumps the slurry through valved line 141 to a slurry settling tank 121 at a rate of about 200 gallons per minute. The mature product diammonium phosphate crystals settle to the bottom of the cone 143 and are removed as a thick slurry through outlet 144 into valved line 145 and passed to a drier (not shown). Overflow liquor from the settling tank is recycled through line 146 and optionally through heater 148 to an inlet 147 in the absorber 20.

The liquor containing in suspension the medium and fine size crystals is removed from the top of the secondary crystals separator 120 through the top outlet 135. About 800 gallons per minute are removed and recycled through recycle line 127 containing a butterfly valve 128 and heater 136 to the conical bottom 33 of the absorber 20. Preferably, the recycle line 127 is separated into two lines at 130. The two lines 131 and 132 enter on opposite sides of the cone 33 of the absorber at inlets 133 and 134 at angles, i.e., about 45°, from the tangents, and a sufficient distance, i.e., about one foot, below the liquor level 61. The direction of the liquor as it enters the cone 33 from lines 131 and 132 is opposite in direction than that of the whirling cyclone of gas in the scrubbing chamber 112. The velocity of the gas cyclone causes the liquor in the bath 60 to rotate in the same direction by surface friction. The recycled liquor entering in a direction opposite to the gas flow will counteract it. This results in excellent mixing of the entering recycle liquor containing the immature crystals with the bath 60. The recirculation of the immature smaller size crystals with the recycle liquor causes them to grow in the supersaturated liquor of the bath 60 and are eventually removed as mature crystals from the system through line 126 as a slurry at a rate of approximately 200 gallons per minute. Although the liquor returned through recycle line 127 is preferably recycled through lines 131 and 132, as described, it is understood that the liquor can be recycled and introduced into the bath 60 through a line or lines in any manner.

In the various embodiments of ammonia absorber systems described above, the liquor recirculated in line 92 is maintained within a pH range between about 6.2 and 6.4. Below the range there is a tendency to make the monoammonium phosphate salt instead of the diammonium phosphate salt. Above the preferred range there is a loss of ammonia since the liquor has a reduced potential for absorbing ammonia from the gases. The acid content of the liquor in line 70 is adjusted by the addition of make-up acid through line 69. The acid content is adjusted in accordance with the pH of the liquor in line 92 to obtain the desired pH range in the system.

As various locations in the systems, sampler lines such as 93, 123, 129 and 142 are used to determine the pH of the liquor and also to determine the crystal concentrations and crystal size. The sample determinations are made in any suitable known manner continuously or at frequent intervals. According to the sample determinations, the butterfly valves 91 and 128 can be set for the most advantageous flow rates to obtain optimum efficiency.

The size of the crystals obtained from the absorber systems described above vary with the particular system used. In the operation of the absorber systems wherein the crystal slurry in line 89 from the crystal separator 86 is sent to an evaporator type crystallizer, the size of the crystals in line 89, about 35%, will be +60 mesh in size. Where the absorber systems utilize primary and secondary crystal separators, the crystal sizes obtainable are 60-80%, +40 mesh and the rest smaller in size.

The heaters such as 73, 95, 136 and 148 are used to heat the liquor which enters the absorber 20. The liquor heaters may be of any suitable type, e.g., heat exchangers, electric resistance, etc.

In all the forms of the invention illustrated, the gas from the gas duct 22 enters the scrubbing chamber 112 only through the slots 24 and 28. It is within the scope of this invention to also permit a portion of the gas to bubble through the area 36 and into the scrubbing chamber. This may be preferably accomplished by providing the inner wall 23 with a serrated lower edge which remains submerged in the body of liquor 60. To achieve a better jet effect of the gas entering the scrubbing chamber from the slots 24 and 28 and to achieve a more violent cyclonic action, the width of the slots can be narrowed, as previously described, until the gas pressure in the gas duct 22 is increased to the point where the liquid seal in the area 36 is partially broken. This allows a small amount of gas (not over 5-7% of total gas volume) to bubble through the liquor in the body 60 and up into the scrubbing chamber 112. The gas bubbling through the liquor agitates the liquor around the serrated submerged edge of the inner wall 23 and keeps salt encrustation from forming at the edge.

While there has been shown and described hereinabove the present preferred embodiments of this invention, it is to be understood that the invention is not limited thereto and that various changes, alterations, and modifications can be made thereto by those skilled in the art without departing from the spirit and scope thereof as defined in the appended claims.

What is claimed is:

1. An apparatus for producing ammonium salt crystals by scrubbing an ammonia-containing gas with an acid-containing ammonium salt liquor, comprising a vertical vessel containing a conical lower portion, an annular gas duct in the upper portion of said vessel, a gas scrubbing chamber surrounded by said gas duct, the bottom portions of said duct and scrubbing chamber being in open communication with the lower conical portion of said vessel, the inner wall of said gas duct containing a plurality of slots at spaced intervals therealong and having guide and deflector vanes associated therewith, for the projection of gas in a substantially horizontal direction from said duct tangentially into the outer periphery of said scrubbing chamber to form a whirling cyclone of gas in said scrubbing chamber, adjustment means carried by said inner wall of said gas duct for regulation of the size of said slots, a liquor distributor disposed at the top of said vessel above said scrubbing chamber and arranged to discharge liquor throughout the cross-sectional area of said scrubbing chamber, a gas outlet at the top center of said vessel, a gas guide cone within said scrubbing chamber the apex of which is adjacent to said gas outlet, and outlet means in the lower portion of said vessel for withdrawing a slurry of salt crystals from said vessel.

2. An apparatus for producing ammonium salt crystals by scrubbing an ammonia-containing gas with an acid-containing ammonium salt liquor, comprising a vertical vessel containing a conical lower portion, an annular gas duct in the upper portion of said vessel, a gas scrubbing chamber surrounded by said gas duct, the bottom portions of said duct and scrubbing chamber being in open communication with the lower conical portion of said vessel, the inner wall of said gas duct containing a plurality of slots at spaced intervals therealong and having guide and deflector vanes associated therewith, for the projection of gas in a substantially horizontal direction from said duct tangentially into the outer periphery of said scrubbing chamber to form a whirling cyclone of gas in said scrubbing chamber, adjustment means carried by said inner wall of said gas duct for regulation of the size of said slots, a liquor distributor comprising a plurality of open bottomed troughs disposed in a circular concentric arrangement at the top of said vessel above said scrubbing chamber for discharging liquor as a plurality of free falling curtains throughout the cross-sectional area of said chamber, a gas outlet at the top center of said vessel, a gas guide cone within said scrubbing chamber the apex of which is adjacent to said gas outlet, and outlet means in the lower portion of said vessel for withdrawing a slurry of salt crystals from said vessel.

3. An apparatus for producing ammonium salt crystals by scrubbing an ammonia-containing gas with an acid-containing ammonium salt liquor, comprising a vertical vessel containing a conical lower portion, an annular gas duct in the upper portion of said vessel, a gas scrubbing chamber surrounded by said gas duct, the bottom portions of said duct and scrubbing chamber being in open communication with the lower conical portion of said vessel, the inner wall of said gas duct containing a plurality of slots at spaced intervals therealong and having guide and deflector vanes associated therewith, for the projection of gas in a substantially horizontal direction from said duct tangentially into the outer periphery of said scrubbing chamber to form a whirling cyclone of gas in said scrubbing chamber, adjustment means carried by said inner wall of said gas duct for regulation of the size of said slots, a liquor distributor comprising a plurality of spray nozzles arranged in a series of concentric rings, the outermost ring of nozzles pointing in the direction of gas flow of said whirling cyclone and the innermost ring of nozzles pointing against the direction of said gas flow, disposed at the top of said vessel above said scrubbing chamber and arranged to discharge sprays of liquor throughout the cross-sectional area of said scrubbing chamber, a gas outlet at the top center of said vessel, a gas guide cone within said scrubbing chamber the apex of which is adjacent to said gas outlet, and outlet means in the lower portion of said vessel for withdrawing a slurry of salt crystals from said vessel.

4. The apparatus of claim 1 which includes in combination a crystal separator comprising crystal slurry inlet means, crystal slurry outlet means, and liquor outlet and recycle means to said liquor distributor of said vessel.

5. The apparatus of claim 1 which includes overflow means in said conical lower portion, and in combination with said vessel and overflow means a liquor conditioning means including acid introduction means, recycle means, and a nozzle in said gas outlet of said vessel whereby makeup acid containing liquor is sprayed into the exiting gases from said vessel.

References Cited by the Examiner

UNITED STATES PATENTS

| 1,716,415 | 6/29 | Buchanan | 23—107 |
| 1,917,915 | 7/33 | Atwater | 23—119 |
| 1,936,308 | 11/33 | Mueller | 23—273 X |
| 2,375,922 | 5/45 | Jeremiassen | 23—273 |
| 2,795,487 | 6/57 | Otto | 23—273 |
| 2,811,424 | 10/57 | Van Ackeren | 23—273 |
| 3,006,622 | 10/61 | Yoshihary-Shimokawa | 261—79 |

MORRIS O. WOLK, *Primary Examiner.*

MAURICE A. BRINDISI, *Examiner.*